(12) United States Patent
Ahlbrand et al.

(10) Patent No.: US 11,414,144 B2
(45) Date of Patent: Aug. 16, 2022

(54) METHOD FOR PRODUCING A VEHICLE COMPONENT, AND VEHICLE COMPONENT PRODUCED ACCORDING TO SAID METHOD

(71) Applicant: ZF Friedrichshafen AG, Friedrichshafen (DE)

(72) Inventors: Marcel Ahlbrand, Bad Essen (DE); Wolfgang Eulerich, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 43 days.

(21) Appl. No.: 16/617,094

(22) PCT Filed: May 16, 2018

(86) PCT No.: PCT/EP2018/062672
§ 371 (c)(1),
(2) Date: Nov. 26, 2019

(87) PCT Pub. No.: WO2018/233941
PCT Pub. Date: Dec. 27, 2018

(65) Prior Publication Data
US 2021/0147019 A1  May 20, 2021

(30) Foreign Application Priority Data

Jun. 19, 2017  (DE) .................... 10 2017 210 212.8

(51) Int. Cl.
*B62D 65/02* (2006.01)
*B23K 26/24* (2014.01)
*F16C 11/06* (2006.01)

(52) U.S. Cl.
CPC ............. *B62D 65/02* (2013.01); *B23K 26/24* (2013.01); *F16C 11/0685* (2013.01)

(58) Field of Classification Search
CPC .. F16C 11/0695; F16C 11/0685; B60G 7/005; B60G 2204/416
See application file for complete search history.

(56) References Cited

U.S. PATENT DOCUMENTS 4,283,833 A * 8/1981 Pyles .................. F16C 11/0633
29/445
4,527,924 A * 7/1985 Asberg ................ F16C 11/0695
403/138

(Continued)

FOREIGN PATENT DOCUMENTS

CN    205 298 248 U    6/2016
DE    102 06 622 A1    8/2003
(Continued)

OTHER PUBLICATIONS

KR-20170036456-A Machine Translation (Year: 2017).*
(Continued)

*Primary Examiner* — Jacob J Cigna
*Assistant Examiner* — Michael W Hotchkiss
(74) *Attorney, Agent, or Firm* — Finch & Maloney PLLC; Jay S. Franklin; Michael J. Bujold (57) ABSTRACT

A method for producing a vehicle component (10), in which a joint housing (1) is inserted in a predetermined insertion direction (13) into a through-hole (12) of a structural component (11). The insertion of the joint housing (1) into the through-hole (12) in the insertion direction (13) terminates when an stop element (6) of the joint housing (1) abuts against the structural component (11). After the insertion, the joint housing (1) is connected to the structural component (11) in a materially-merged manner. To reduce the complexity and/or the production costs, the method includes the joint housing (1) being inserted into the through-hole (12) with its housing bottom (4) first.

14 Claims, 5 Drawing Sheets

(56) References Cited

U.S. PATENT DOCUMENTS

| | | | | |
|---|---|---|---|---|
| 4,954,006 | A | * | 9/1990 | Suzuki ................ F16C 11/0657 403/133 |
| 5,167,310 | A | * | 12/1992 | Fischer ................ F16D 13/644 192/113.5 |
| 5,611,635 | A | * | 3/1997 | Schutt ................ F16C 11/0642 403/135 |
| 5,676,485 | A | * | 10/1997 | Lee .................... F16C 11/0642 277/635 |
| 5,743,669 | A | * | 4/1998 | Fujita ................. F16C 11/0633 29/898.051 |
| 5,876,149 | A | * | 3/1999 | Dorr ................... F16C 11/0657 403/134 |
| 6,190,080 | B1 | * | 2/2001 | Lee .................... F16C 11/0638 403/135 |
| 7,121,757 | B2 | * | 10/2006 | Ersoy ................ F16C 11/0628 403/141 |
| 8,256,980 | B2 | | 9/2012 | Walter et al. |
| 8,657,314 | B2 | * | 2/2014 | Mosteiro Goyoaga ..................... F16C 11/0685 280/124.107 |
| 8,684,621 | B2 | * | 4/2014 | Forthaus ............ F16C 11/0638 403/135 |
| 9,227,480 | B2 | * | 1/2016 | Jekel .................. B60G 7/005 |
| 9,429,186 | B2 | | 8/2016 | Forthaus et al. |
| 9,476,447 | B2 | * | 10/2016 | Schmidt ................ B60G 7/005 |
| 10,087,983 | B2 | * | 10/2018 | Forthaus ............ F16C 11/0628 |
| 2002/0146277 | A1 | * | 10/2002 | Kuroda ............... F16C 11/0685 403/135 |
| 2006/0153632 | A1 | * | 7/2006 | Bernhardt .......... F16C 11/0695 403/122 |
| 2008/0213035 | A1 | | 9/2008 | Scheper |
| 2009/0129854 | A1 | * | 5/2009 | Walter ................ F16C 11/0695 403/42 |
| 2012/0170969 | A1 | * | 7/2012 | Forthaus ............... F16C 11/069 403/50 |
| 2013/0216298 | A1 | * | 8/2013 | Jekel ..................... B60G 7/005 403/66 |
| 2013/0219720 | A1 | * | 8/2013 | Jekel ..................... B60G 21/00 29/897.2 |
| 2014/0212205 | A1 | * | 7/2014 | Forthaus ............. F16C 11/0695 403/122 |
| 2016/0281772 | A1 | * | 9/2016 | Eulerich .................. B23K 9/16 |
| 2017/0030402 | A1 | * | 2/2017 | Forthaus ............. F16C 11/0666 |
| 2017/0129040 | A1 | * | 5/2017 | Eulerich ............. F16C 11/0695 |
| 2019/0071121 | A1 | * | 3/2019 | Wilhelm ................. B62D 7/18 |

FOREIGN PATENT DOCUMENTS

| | | | |
|---|---|---|---|
| DE | 10 2005 025 551 A1 | 12/2006 | |
| DE | 10 2006 008 252 A1 | 8/2007 | |
| DE | 10 2010 043 040 A1 | 5/2012 | |
| DE | 10 2011 108 881 A1 | 1/2013 | |
| DE | 10 2015 207 176 A1 | 12/2015 | |
| DE | 20 2015 100 906 U1 | 7/2016 | |
| DE | 10 2016 208 579 B3 | 8/2017 | |
| JP | 2014069700 A * | 4/2014 | ......... F16C 11/0695 |
| KR | 20170036456 A * | 4/2017 | |

OTHER PUBLICATIONS

JP-2014069700-A Machine Translation (Year: 2014).*
German Office Action Corresponding to 10 2017 210 212.8 dated Apr. 9, 2019.
International Search Report Corresponding to PCT/EP2018/062672 dated Aug. 29, 2018.
Written Opinion Corresponding to PCT/EP2018/062672 dated Aug. 29, 2018.

* cited by examiner

Fig. 5

METHOD FOR PRODUCING A VEHICLE COMPONENT, AND VEHICLE COMPONENT PRODUCED ACCORDING TO SAID METHOD This application is a National Stage completion of PCT/EP2018/062672 filed May 16, 2018, which claims priority from German patent application serial no. 10 2017 210 212.8 filed Jun. 19, 2017.

FIELD OF THE INVENTION

The invention relates to a method for producing a vehicle component, in which a joint housing is inserted in a predetermined insertion direction into a through-going hole of a structural component, wherein the insertion of the joint housing into the through-hole in the insertion direction is completed when an stop element of the joint housing comes into contact with the structural component, and after the insertion the joint housing is connected to the structural component in a materially-merged manner. In addition the invention relates to a vehicle component produced in accordance with the method according to the invention.

BACKGROUND OF THE INVENTION

Such a method and vehicle component are known from DE 10 2010 043 040 A1. In that case a structural component, pre-coated on its outside, is permanently solidly connected by a materially-merging joining process to a joint cartridge pre-coated on its outside and pre-assembled to a joint. The pre-coatings of the joint cartridge and the structural component must be at least partially removed before the materially-merging joining process is carried out, in order to avoid defects in the materially-merged connection. In this, it is a disadvantage that the removal of the coating in the area of the materially-merged connection entails additional effort. Furthermore, the through-hole in the structural component for receiving the joint cartridge cannot be made by stamping, since otherwise this would adversely affect the effectiveness of the already applied corrosion protection of the structural component by damaging the surface coating. Thus, the holder or through-hole for the joint cartridge has to be produced by a laser cutting process, which gives rise to added complexity and further increased costs. It is also disadvantageous that on a collar side of the joint cartridge a gap can be created between the joint cartridge and the structural component holding it. That gap carries the risk of crevice corrosion, especially in the area of a weld seam root.

From the still unpublished German patent application No. 10 2016 208 579.4, the integration of a joint housing into a structural component by means of a double-sided weld is known. However, the double-sided weld incurs considerable additional costs for the equipment technology required and results in an undesired increase of the cycle time during the mass-production of the vehicle component. Furthermore, it is disadvantageous that due to the high hardness in the weld seams, no adequately favorable surface protection and in particular an electroplated coating can be used, since otherwise there is a risk of hydrogen embrittlement. Together with the longer cycle time for the double-sided welding, all-in-all this results in undesirably high production costs. Moreover it is a disadvantage that the joint housing is made by a cold-forging process, which due to the tolerances required for the welding process is complicated and thus results in additional undesired costs. Furthermore, such cold-forged components often subsequently have to be machined in the area of a groove for holding bellows.

SUMMARY OF THE INVENTION

The object of the present invention is to further develop a method and/or a vehicle component of the type mentioned to begin with, in such manner that the complexity and/or the production costs can be reduced. In particular, an alternative embodiment should be provided.

The objective which the invention aims to address is achieved by a method and a vehicle component according to the independent claim(s). Preferred further developments of the invention are to be found in the subordinate claims and in the description that follows.

The method for producing a vehicle component comprises the following process steps: insertion of a joint housing, in particular one that is open on one side, in a specified insertion direction into a through-hole in a structural component; ending of the insertion of the joint housing into the through-hole in the insertion direction as soon as an stop element of the joint housing comes into contact with the structural component, and after the insertion, connecting the joint housing to the structural component in a materially-merged manner. For the insertion into the through-hole, the joint housing is introduced into the through-hole with its housing bottom entering first.

In this, it is advantageous that due to the insertion of the joint housing in the insertion direction with the housing bottom of the joint housing entering first, the stop element comes in contact with or abuts against the side of the structural component facing away from the housing bottom. In particular, when the joint housing is inserted with the housing bottom entering first, a housing opening faces away from the through-hole. In combination with the materially-merged connection of the joint housing to the structural component, the solution according to the invention enables an inexpensive production method and vehicle component to be provided.

Preferably, the joint housing and/or the structural component is/are coated after the materially-merged connection of the joint housing to the structural component. In that way the joint housing and the structural component can be connected in a materially-merged manner in an uncoated condition. In particular, a joint is fitted into the joint housing. Preferably, the joint is fitted after the materially-merged connection and/or after the coating. When fitting the joint an inside part with a bearing area can be inserted into the joint housing. Then, the joint housing can be closed. Preferably, due to the closure of the joint housing the bearing area of the inside part of the joint is enclosed in the joint housing, whereas the inside part of the joint extends out of the joint housing, in particular through a housing opening of the joint housing. The joint housing can be closed by deforming and/or rolling over a housing rim of the joint housing.

After the materially-merged connection a heat treatment can be applied. In particular, by virtue of the heat treatment a hardness of the materially-merged connection can be reduced. Thereby, in particular customary or conventional electroplating coatings, preferably ZnFi or ZnNi coatings, can subsequently be applied to the vehicle component and/or to the materially-merged connection. In that way inexpensive corrosion protection means can be produced.

Preferably, the joint housing and/or the joint has a central longitudinal axis, joint axis and/or axial axis. The joint and/or the inside part of the joint can be fitted so as to move about such an axis. Preferably, the central longitudinal axis extends in the axial direction of the joint housing. A joint axis of the inside part of the joint and the central longitudinal axis of the joint housing can coincide. In particular the joint housing, the joint and/or the inside part of the joint are formed rotationally-symmetrically or substantially rotationally-symmetrically relative to the central longitudinal axis. The central longitudinal axis and/or the joint axis can extend through amid-point of the in particular ball-like or spherical bearing area of the inside part of the joint.

The vehicle component can comprise a joint. The joint can be in the form of a ball joint. In particular the joint is a wheel-guiding joint. Preferably, the inside part of the joint with its bearing area is fitted into the joint housing in a sliding and/or articulated manner. In particular the inside part of the joint is a ball stud and the bearing area of the inside part of the joint is in the form of a joint ball. Preferably the inside part of the joint is made of metal. The inside part of the joint can be in the form of a joint stud and/or ball stud.

Preferably the insertion direction, particularly during and/or after the insertion of the joint housing into the through-hole, extends in the direction of a housing axis and/or central longitudinal axis of the joint housing. In particular the insertion direction extends in the direction of a hole axis of the through-hole.

In the context of the present application the expression "radial" can indicate a direction, or any direction, that extends perpendicularly to the axial direction of the joint housing, the joint, the joint axis and/or the central longitudinal axis. In particular, the inside part of the joint is fitted so that it can rotate and/or tilt in the joint housing and/or in a bearing shell. The bearing shell can be inserted through the through-hole into the joint housing before the inside part of the joint is fitted. In particular, the bearing shell is made of plastic.

Preferably, the term "tilting" or "inclination" of the inside part of the joint is understood to mean a movement of the inner part relative to the joint housing, in which a change of an angle enclosed between a longitudinal axis of the inner part of the joint and a longitudinal axis of the joint housing takes place. Preferably, the tilting or inclination takes place about the mid-point of the bearing area of the joint inner part. A tilt angle of the inside part of the joint is in particular an angle enclosed between the longitudinal axis of the inside part of the joint and the longitudinal axis of the joint housing. In the untilted position of the inside part of the joint, the tilt angle is preferably zero and/or the longitudinal axis of the inside part of the joint and the longitudinal axis of the joint housing are coincident. In particular the longitudinal axis of the housing corresponds to the central longitudinal axis of the joint housing.

In particular, "rotating" or "twisting" of the inside part of the joint is understood to mean a movement in which the inside part of the joint rotates relative to the joint housing about the longitudinal axis of the inside part of the joint.

In the context of the invention a through-hole is understood to mean a round, or even non-circular opening that extends through the structural component. Preferably, the through-hole is circular or circle-shaped. The through-hole is preferably completely enclosed by the structural component all the way round. In particular the through-hole has a rim. In connection with the invention a rim of the through-hole is understood to mean a line of intersection formed by the inside wall of the through-hole and one of the two major surfaces and/or sides of the structural component which are separated from one another by the distance corresponding to the materially thickness of the structural component.

According to a further embodiment the joint housing and the structural component are connected to one another in a materially-merged manner with at least one direction component contrary to the insertion direction. In that way the joint can be formed by welding. Thus, a joint direction for materially-merged connection can have at least one direction component which is directed contrary to the insertion direction for inserting the joint housing into the through-hole. In this way a complete or at least partial overlay of the insertion direction and the joining direction can be avoided, whereby the creation of an appropriate equipment technique for mass production is simplified. Preferably, and in particular exclusively, the joint housing and the structural component are connected to one another in a materially-merged manner starting from a side of the structural component facing away from the stop element and proceeding toward the stop element. Thus, the structural component can have a first side against which the stop element bears completely or at least in part. Furthermore, the structural component can have a second side facing away from the first side. This second side faces away from the stop element. In particular, the materially-merged connection of the joint housing to the structural component takes place starting from the second side of the structural component. Then, the materially-merged connection and/or joining direction extends starting from the second side, in the direction toward the first side and/or in the direction of the stop element.

Preferably, the joint housing and the structural component are joined to one another by a materially-merged connection, such that the materially-merged connection, in particular a weld seam, extends starting from a side of the structural component that faces away from the stop element, as far as into the stop element. In that way the formation of a gap and/or any crevice corrosion can be reliably avoided. In particular, there is a weld seam root in the area of the stop element.

Preferably, a contact zone of the joint housing with the structural component is completely joined in a materially-merged manner. In particular the joint housing and the structural component are welded completely to one another in the contact zone. In particular the contact zone comprises all the surfaces of the joint housing and the structural component which, after the joint housing has been inserted into the through-hole, touch or are in contact with one another. The joint housing and the structural component can be joined to one another by means of a materially-merged connection made from one side. Specifically, in this context "from one side" means that the materially-merged connection is produced exclusively starting from the side of the structural component that faces away from the stop element. The materially-merged connection can then be designed such that the whole of the contact zone and/or the whole of the areas available for joining the components to be joined to one another are connected, in particular due to the weld penetration.

According to a further development, the materially-merged connection between the joint housing and the structural component is produced by a beam-welding process, in particular by laser welding. The materially-merged connection can be produced by laser welding or fusion welding. Beam welding or laser welding is advantageous because it enables cleaner welding without a filler materially and without the formation of slag. In particular, for the possible application of a corrosion protection surface treatment the weld seam does not have to be finish-machined. A gap in the joint area and/or the contact area can be avoided by fusion welding, since any air gap or joint gap still present after joining can be filled with molten metal. Thus, after the welding or joining there is no longer any gap, so that crevice corrosion can be avoided.

In a further embodiment the stop element before the insertion of the joint housing is in the form of a step extending outward from an outside of the joint housing. Such a step can be made simply and inexpensively, in particular by deformation. In particular, the stop element surrounds the joint housing. Preferably, the stop element is made integrally with the joint housing. The stop element can surround the joint housing radially relative to a central longitudinal axis, in particular a central longitudinal axis of the joint housing. Thus, the stop element and/or step can be shaped like a ring or collar.

According to a further development, during its insertion into the through-hole the joint housing can be pressed in. In that way, by virtue of the insertion of the joint housing into the through-hole a press-fit can be produced between the joint housing and the structural component. To enable the pressing in or press-fit, at least in the contact zone of the joint housing with the structural component and/or a rim of the through-hole, the outer diameter of the joint housing is larger than the inner diameter of the through-hole. This oversize is what enables the pressing in or press-fit.

According to a further development, after the insertion of the joint housing into the through-hole and/or after the materially-merged connection of the joint housing to the structural component, a securing element for the additional securing of the joint housing to the structural component is formed on the outside of the joint housing. In particular, the securing element is made integrally with the joint housing. Even if the materially-merged connection between the joint housing and the structural component should fail and/or if a corresponding weld seam fractures, the risk of an undesired complete detachment of the joint housing from the structural component can be reduced by means of the securing element. Preferably, after the joint housing has been inserted into the through-hole the materially-merged connection is made first and the securing element is formed only after the completion of the materially-merged connection. This ensures sufficient accessibility for producing the materially-merged connection. If, according to an alternative conceivable embodiment, the securing element were to be formed first after the insertion of the joint housing into the through-hole, the securing element could impede accessibility for a subsequent production of the material-merged connection.

In particular, the securing element is arranged in the area of a side of the structural component facing away from the stop element. By virtue of the co-operation of the stop element and the securing element, the joint housing can be held and/or secured onto the structural component in a form-enclosed manner. In particular, the structural component is clamped between the stop element and the securing element.

Preferably, the securing element is in the form of a projection and/or bead extending outward from an outside of the joint housing. The securing element can surround the joint housing and/or be in the form of a ring. Preferably the securing element surrounds the joint housing radially relative to a central longitudinal axis, in particular a central longitudinal axis of the joint housing. The stop element and the securing element can be a distance apart that corresponds, or corresponds essentially, to the thickness of the structural component in the area of the through-hole. The securing element can be produced by deforming an area of the outside of the joint housing. In particular, the securing element is made in the form of an upset undercut.

According to a further embodiment, a holding groove for fitting the rim of a sealing bellows is formed between on the one hand the stop element and/or a side of the structural component in contact with the stop element, and on the other hand a projecting housing rim of the joint housing. Preferably, the housing rim surrounds a housing opening of the joint housing. In particular, the housing rim projects radially relative to a central longitudinal axis, preferably an axis of the joint housing. In particular it is advantageous for the holding groove not to be influenced by the materially-merged connection of the joint housing to the structural component. Preferably the materially-merged connection is formed from the side facing away from the holding groove in the contact zone of the joint housing with the structural component. In that way a sufficiently clean, uninfluenced and/or reproducible holding groove for fitting the rim of the sealing bellows can be provided.

In particular, the sealing bellows has the function of protecting a joint area of the joint from external environmental influences such as dirt, moisture, mechanical influences and the like. In this case the sealing bellows can also serve as a reservoir for joint lubricant. The joint lubricant can ensure permanent lubrication in order to reduce the friction between the components that move relative to one another. The sealing bellows can be made of a flexible, in particular elastic material or elastomer, in the form of a hollow body similar to a hose with two open ends. In this case, at one axial end facing toward the joint housing the sealing bellows has a rim or rim section on the housing side, and at an opposite end, the end facing the inside part of the joint, a rim or rim section on the side toward the inside part of the joint or joint stud. The sealing bellows is in the form of a sheath that extends between the rims of the sealing bellows. In principle the sheath can be designed in various ways, but to ensure the mobility of the joint a contour can be chosen which can be both compressed and stretched, such as a bulging contour and/or a contour with folds. In the latter case one speaks of a so-termed folding bellows and if there are a plurality of folds, a multi-folding bellows.

The vehicle component according to the invention is made by means of the method according to the invention. In particular, the materially-merged connection between the joint housing and the structural component extends over the whole of the contact zone between the joint housing and the structural component as far as the stop element. This reliably avoids the formation of a gap and/or prevents any crevice corrosion. In particular the materially-merged connection is in the form of a weld seam made or produced from one side. Preferably, starting from the side of the structural element that faces away from the stop element the weld seam extends in the direction toward the stop element and into the latter. Thus, a weld seam root can be arranged in the area of the stop element.

The through-hole can be cylindrical. Correspondingly, a contact zone and/or connection zone of the outer peripheral surface of the joint housing can be in the form of a cylindrical area. The through-hole of the structural component can be made in the structural component by stamping or perforation-stamping or drilling. Preferably, the joint housing is prepared and/or produced, in particular, before its insertion into the through-hole. The joint housing can be made of metal. The outer peripheral surface of the joint housing can be cylindrical or essentially cylindrical. In particular, the joint housing is pot-shaped or like a pot. The joint housing can be made from sheet and/or from solid material. In particular, the joint housing is in the form of a deep-drawn sheet component. For this, the blank for the joint housing can be of the same quality as the joint. Alternatively the joint housing can be produced by a solid deformation process, in particular cold flow-molding, hot flow-molding and/or forging. Furthermore the joint housing can be made as a component machined from solid material, or at least part of it may have been machined.

Preferably, the joint housing has a housing opening through which, after the joint has been assembled, the inside part of the joint extends out of the joint housing. The joint housing has a housing bottom which is preferably opposite the opening of the housing, specifically in the direction of the central longitudinal axis of the joint housing. An outside of the housing bottom faces away from the housing opening. When the joint housing is inserted into the through-hole, the joint housing is introduced into the through-hole with the outside of the housing bottom first. The housing bottom can be made integrally with the joint housing or in the form of a cover connected to the joint housing.

Preferably, the joint housing is closed by bending inward the housing rim of the housing opening, and/or by inserting a preferably ring-shaped insert into the housing opening. For example the inside part of the joint, in particular a bearing portion of the inside part of the joint, is held inside the joint housing by bending and/or rolling over the rim of the housing.

The structural component can be made of metal. In particular, the structural component is made of sheet metal. The structural component can be in the form of a flange. In the context of the present invention a structural component can be understood to mean an extensive metallic sheet component which, for example, is curved, partially curved, or flat or partially flat. In particular, "extensive" means that the thickness of the material of the structural component is much smaller than the other dimensions of the structural component. Preferably the material thickness is constant over the extended size of the structural component. Furthermore the structural component can be made from a single sheet and/or put together from a plurality of sheet sections. In the latter case the sheet sections can be connected to one another by materially-merged joining, or connected to one another with interlock in some other way.

Preferably, in the area of the step the joint housing has an outer circumference, in particular transversely or at right angles to the central longitudinal axis and/or the insertion direction, which is larger than the inner diameter of the through-hole. By means of the stop element the joint housing is secured with interlock against the structural component in the insertion direction. In particular, after the insertion of the joint housing into the through-hole the stop element is located outside the through-hole.

In particular, the vehicle component is a chassis component. Thus, the vehicle component can be built into a chassis of a vehicle or motor vehicle. Preferably, the inside part of the joint is connected to a vehicle component or chassis component and/or the structural component is connected to a further vehicle component and/or chassis component. The vehicle component and/or chassis component can be a flange joint, a wheel-guiding joint, a press-fitted joint, a transverse control arm, a longitudinal control arm, a trailing arm, a strut, a semi-trailing arm, a spring link or a track-rod. The vehicle component can be in the form of a two-point, three-point, four-point or multi-point control arm. In particular the structural component can be in the form of a multi-point control arm, a bar-shaped strut, a track-rod, a subframe, pivot bearing or a wheel carrier.

In particular, the vehicle component produced in accordance with the method according to the invention is a vehicle component according to the invention as described earlier. Preferably the method is developed further in accordance with all the design features explained in connection with the vehicle component described herein. Furthermore, the vehicle component described herein can be developed further in accordance with all the features explained in connection with the method.

BRIEF DESCRIPTION OF THE DRAWINGS

Below, the invention is explained in greater detail with reference to the figures, in which the same indexes refer to the same, similar or functionally equivalent components or elements, and which show.

DETAILED DESCRIPTION OF THE PREFERRED EMBODIMENTS

Figure 1:
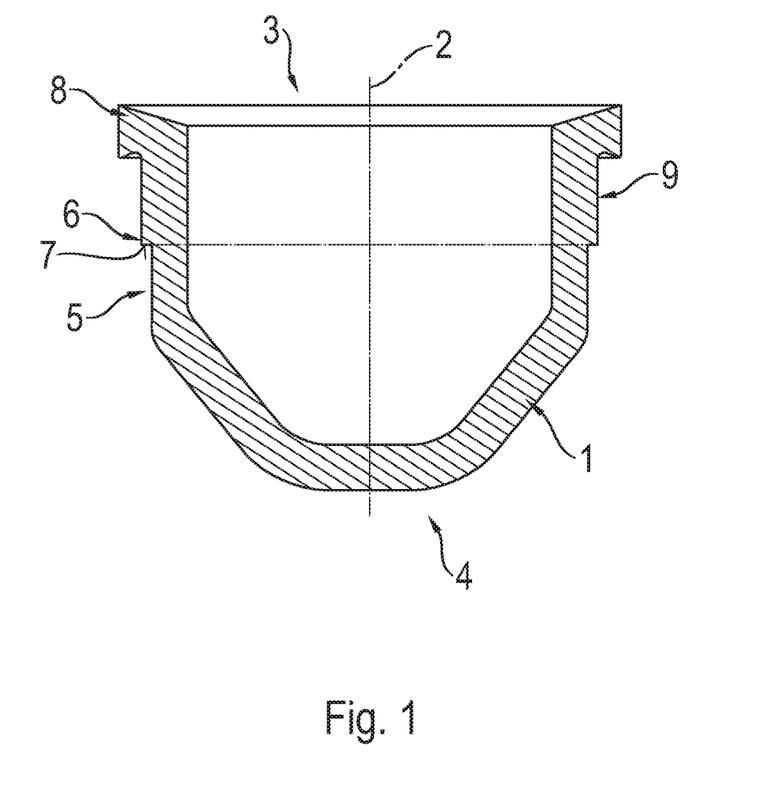
FIG. 1: A sectional side-view of a joint housing for a method and vehicle component according to the invention.

FIG. 1 shows a sectional side-view of a joint housing 1 for a method and vehicle component according to the invention. The joint housing 1 is essentially pot-shaped. In this example embodiment the joint housing 1 is produced from sheet-metal by a deep-drawing process. The joint housing 1 has a central longitudinal axis 2. The joint housing 1 is formed rotationally-symmetrically relative to the central longitudinal axis 2. Furthermore, the joint housing 1 extends in the axial direction of the central longitudinal axis 2.

The joint housing 1 has a housing opening 3 in the direction of the central longitudinal axis 2, and a housing bottom 4 is arranged opposite the housing opening 3. In this example embodiment the housing bottom 4 is formed integrally with the joint housing 1.

At its outer peripheral surface the joint housing 1 has a contact zone or connection zone 5. In this example embodiment the connection zone 5 is cylindrical. The connection zone 5 is designed to be in contact with a rim of a through-hole in a structural component (not shown here) that corresponds with the connection zone 5.

Furthermore, the joint housing 1 has an stop element 6. In this example embodiment the stop element 6 is in the form of a step extending radially outward relative to the central longitudinal axis 2. The stop element 6 has an abutment surface 7 that extends at right-angles to the central longitudinal axis 2. Starting from the abutment surface 7 the stop element 6 extends in the axial direction of the central longitudinal axis 2 toward the housing opening 3. Thus, in the connection zone 5 the joint housing 1 has a smaller outer diameter than in the area of the outward-projecting stop element 6. Starting from the connection zone 5 and in the axial direction of the central longitudinal axis 2 in the direction toward the housing bottom 4, the outer diameter of the joint housing 1 decreases to form a cone-like or funnel-shaped area of the joint housing 1.

The housing opening 3 is surrounded by a housing rim 8 of the joint housing 1. The housing rim 8 projects radially or perpendicularly outward relative to the central longitudinal axis 2. Thus, in the area of the housing rim 8 the joint housing 1 has its maximum outer diameter. The housing rim 8 is a distance away from the stop element 6 in the axial direction of the central longitudinal axis 2. As a result, a holding-groove section 9 is formed between the stop element 6 and the housing rim 8. In the area of the holding groove section 9 the outer diameter of the joint housing 1 is smaller than the outer diameter in the area of the housing rim 8 but larger than the outer diameter in the area of the connection zone 5.

Figure 2:
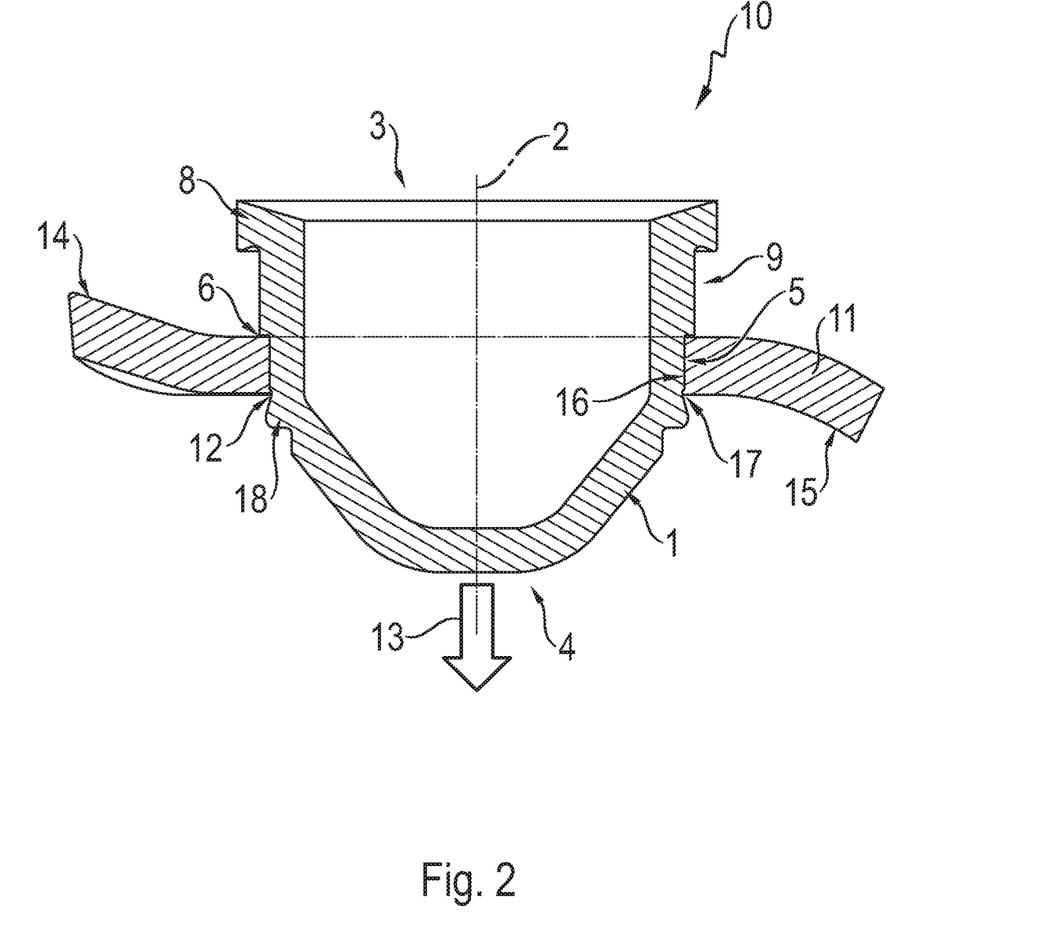
FIG. 2: A sectional side-view of a vehicle component according to the invention with the joint housing according to FIG. 1, FIG. 3: A portion of the sectional side-view of the vehicle component according to the invention shown in FIG. 2, FIG. 4: A sectional side-view of the vehicle component according to the invention shown in FIGS. 2 and 3, with a joint.

FIG. 2 shows a sectional side-view of a vehicle component 10 with the joint housing 1 according to FIG. 1. The vehicle component 10 comprises a structural component 11. In this example embodiment the structural component 11 is in the form of a sheet metal component or flange. The structural component 11 has a through-hole 12. Into the through-hole 12 has been inserted the joint housing 1 according to FIG. 1, in the insertion direction indicated by the arrow 13. As shown by the insertion direction 13 the joint housing 1 is inserted into the through-hole 12 with the housing bottom 4 first. The insertion of the joint housing 1 ends or stops as soon as the stop element 6 of the joint housing 1 comes in contact with the structural component 11. Then, the abutment surface 7 of the stop element 6 according to FIG. 1 bears against a first side 14 of the structural component 11. Facing away from the first side 14 and the stop element 6, the structural component 11 has a second side 15.

The through-hole 12 forms a rim 16 of the structural component 11. The rim 16 of the structural component 11 is in contact with the connection zone 5 of the joint housing 1. Thus, the rim 16 and the connection zone 5 form a common contact zone 17. In this example embodiment, relative to the inside diameter of the through-hole 12 the connection zone 5 is slightly oversized. Accordingly, in the insertion direction 13 the joint housing 1 has to be press-fitted into the through-hole 12. By virtue of a press-fit the joint housing 1 is held by friction force in the through-hole 12 of the structural component 11.

After the joint housing 1 has been inserted into the through-hole 12, the joint housing 1 and the structural component 11 are joined to one another in the contact zone 17 in a materially-merged manner.

Then, a securing element 18 is produced for additionally securing the joint housing 1 to the structural component 11. The securing element 18 is formed integrally with the joint housing 1. The securing element 18 is arranged in the area of the second side 15 of the structural component 11 that faces away from the stop element 6. In this case the securing element 18 is in the form of a projection or bead extending outward from the outer peripheral surface of the joint housing 1. The securing element 18 surrounds the joint housing 1 radially relative to the central longitudinal axis 2. The securing element 18 is formed by deformation, specifically by upsetting the material. The securing element 18 co-operates with the second side 15 of the structural component 11. In the area of the securing element 18 the outer diameter of the joint housing 1 is larger than in the connection zone 5. By virtue of the co-operation of the stop element 6 and the securing element 18 a form-enclosing connection of the joint housing 1 to the structural component 11 is produced. At the same time additional security against working loose is provided. While the stop element 6 ensures that the joint housing 1 is secured in the insertion direction 13 in a form-enclosed manner, the securing element 18 ensures that the joint housing 1 is secured in the direction opposite to the insertion direction 13, again in a form-enclosed manner.

Alternatively to this sequence, after the joint housing 1 has been inserted into the through-hole 12 the securing element 18 is produced first, and only then are the joint housing 1 and the structural component 11 joined in the contact zone 17 by a materially-merging method. In this case, however, the difficulty may arise that the securing element 18 restricts access for the materially-merged connection. In that case it may be necessary to weld through the securing element 18, at least in part.

Figure 3:
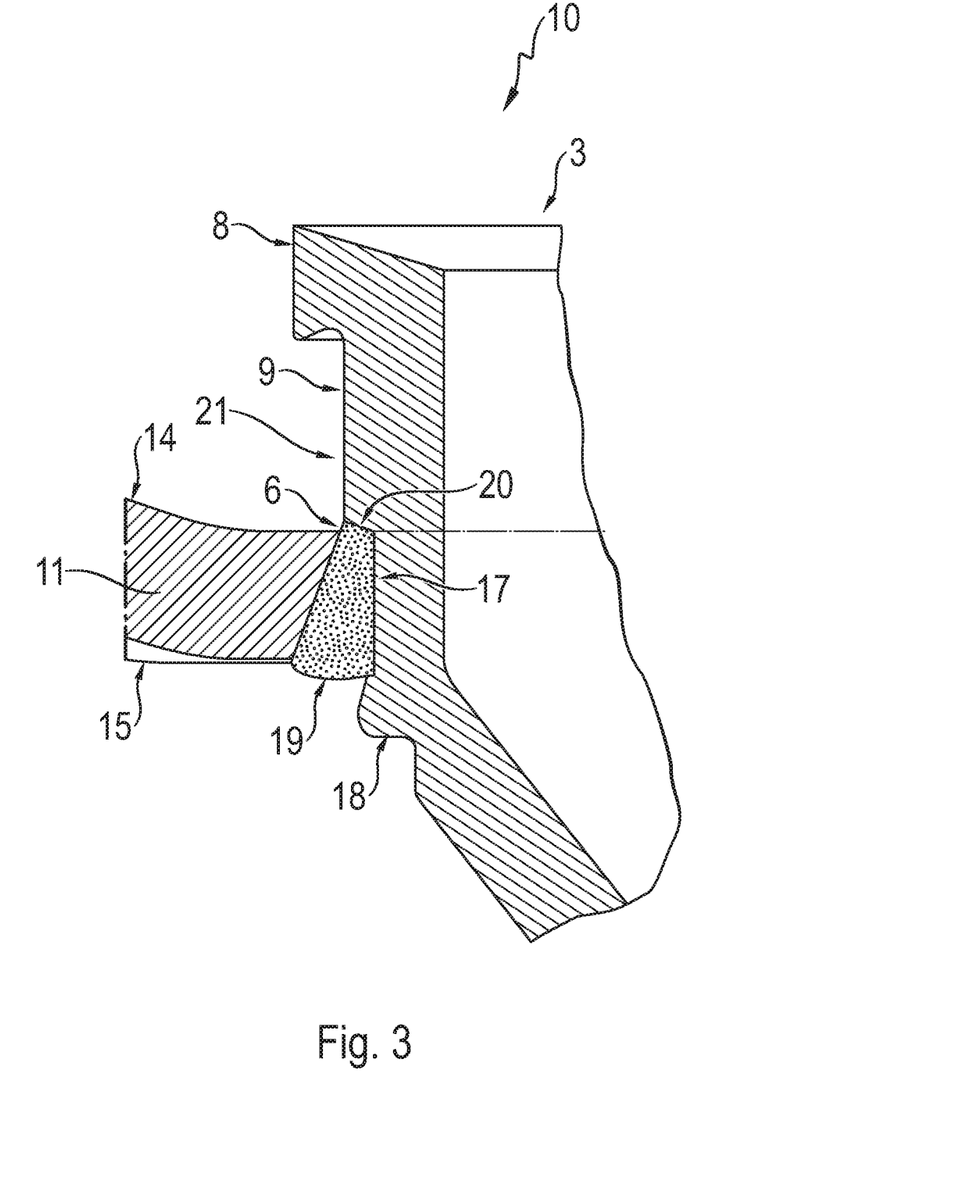

FIG. 3 shows an enlarged portion of the sectional side-view of the vehicle component 10 according to FIG. 2. In the contact zone 17 a materially-merged connection 19 is made. In this example embodiment the materially-merged connection 19 is in the form of a weld seam. Specifically, the materially-merged connection 19 is produced by laser welding. For this, starting from the second side 15 of the structural component 11 the materially-merged joint 19 is realized in the form of a weld seam made from one side in the contact zone 17. Starting from the second side 15, the materially-merged connection 19 extends toward the stop element 6 and into the latter. Thus, the whole of the contact zone 17 between the joint housing 1 and the structural component 11 is connected in the materially-merged manner. In detail, referring to FIGS. 1 and 2, the connection zone 5 of the joint housing 1 is connected to the rim 16 of the through-hole 12 and the abutment surface 7 of the joint housing 1 to the first side 14 of the structural component 11 in a materially-merged manner, in particular by welding. Thus, a weld seam root 20 is located in the area of the stop element 6.

The housing rim 8, the holding groove section 9 and part of the first side 14 of the structural component 11 form a holding groove 21. The holding groove 21 serves to enable the fitting of a rim of a sealing bellows (not shown here).

Figure 4:
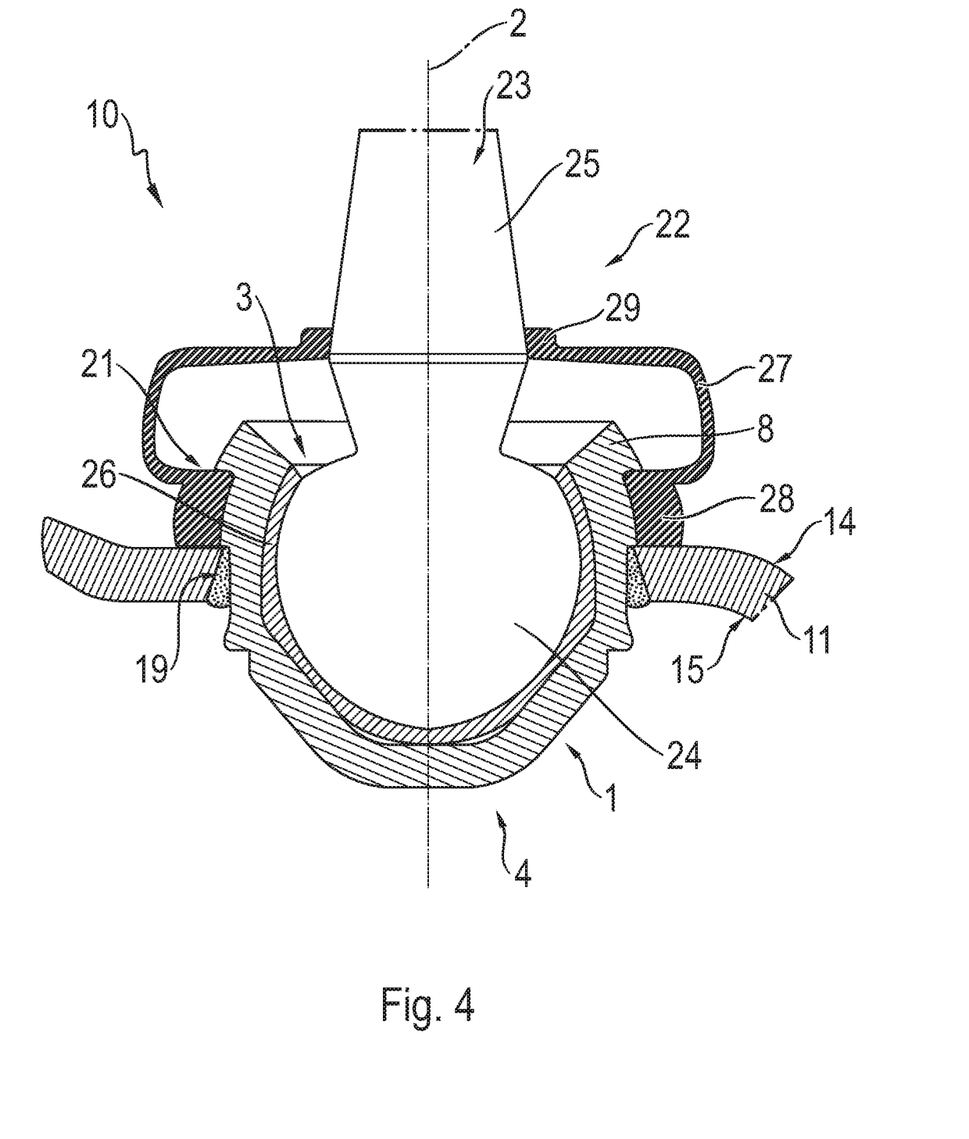

FIG. 4 shows a sectional side-view of the vehicle component 10 according to FIGS. 2 and 3, with a joint 22. In this example embodiment the joint 22 is a ball joint. The joint 22 has an inner joint part 23. The inner joint part 23 has a bearing area 24. In this case the bearing area 24 is in the form of a joint ball. Moreover, the bearing area 24 is arranged inside the joint housing 1. The inner joint part 23 has a joint stud 25, which extends out of the housing opening 3. In this example embodiment the inner joint part 23 is in the form of a ball stud. Inside the joint housing 1 is arranged a joint shell or bearing shell 26. The bearing shell 26 is made of a plastic material. In this example embodiment the inner joint part 23 with its bearing area 24 has been snapped into the bearing shell 26. Then, the bearing shell 26 together with the inner joint part 23 has been inserted into the joint housing 1. Alternatively, the bearing shell 26 can be inserted into the joint housing first and the inner joint part 23 is then inserted into the joint housing 1, whereby the bearing area 24 is fitted into the bearing shell 26.

Once the inner joint part 23 has been inserted, the rim 8 of the housing has been deformed or rolled over to close the joint 22. In this case the housing rim 8 is bent inward toward the central longitudinal axis 2. In that way the bearing area 24 is held reliably in the joint housing 1.

Thereafter, a sealing bellows 27 is fitted over the inner joint part 23 and fixed onto the joint housing 1. Thus, the sealing bellows 27 extends between the joint housing 1 and the inner joint part 23, so that the housing opening 3 is covered. A rim 28 of the sealing bellows 27 on the joint housing side engages in the holding groove 21. In addition or alternatively, the rim 28 may comprise a locking ring (not shown here). Furthermore, the sealing bellows 27 is in seal-forming contact against a rim 29 on the side of the inner joint part 23. For this, the rim 29 can have a locking ring (not shown here).

Figure 5:
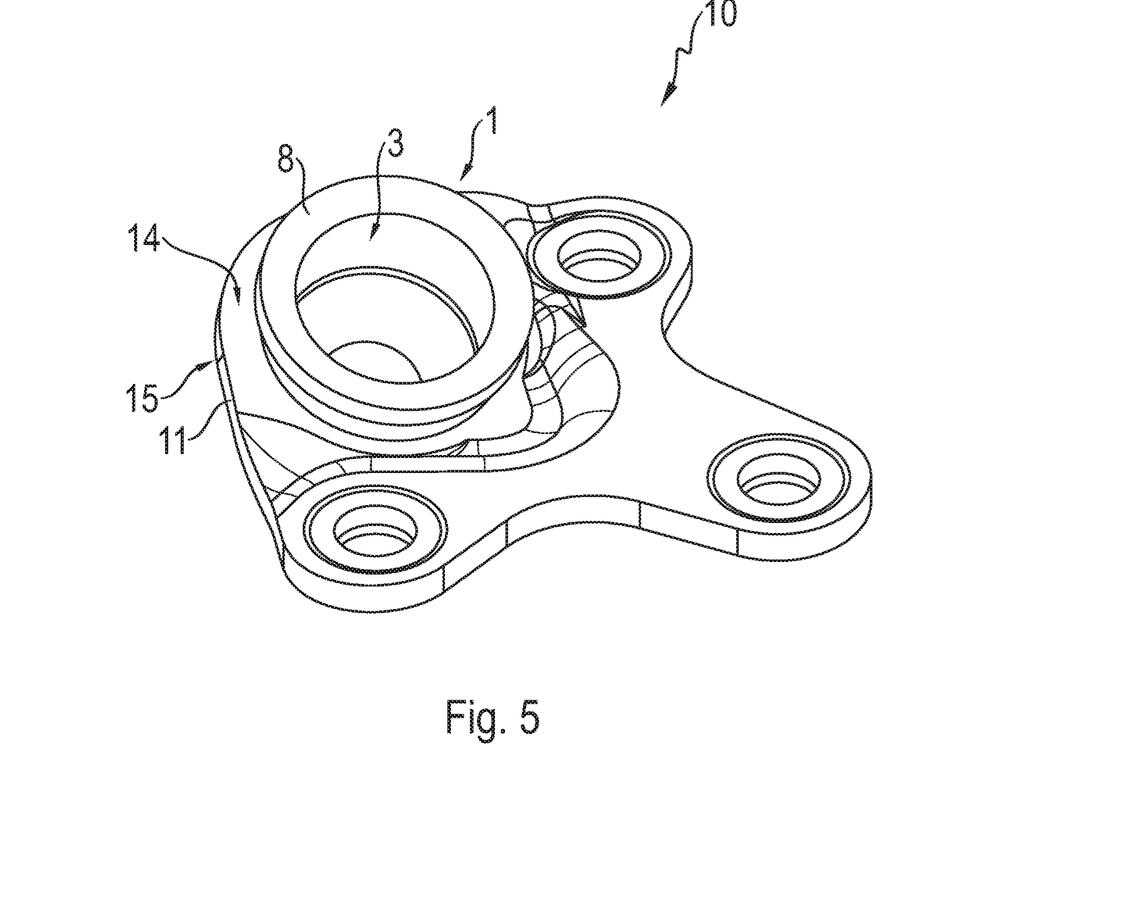
FIG. 5: A perspective side-view of the vehicle component according to the invention shown in FIGS. 2 and 3.

FIG. 5 shows a perspective side-view of the vehicle component 10 according to the invention, shown in FIGS. 2 and 3. For greater clarity, the joint 22 with the inner joint part 23 and the sealing bellows 27 are omitted. According to this example embodiment, with the joint 22 and the inside part of the joint 23 and sealing bellows 27, the vehicle component 10 is in the form of a flange joint.

INDEXES

1 Joint housing
2 Central longitudinal axis
3 Housing opening
4 Housing bottom
5 Connection zone
6 Stop element
7 Abutment surface
8 Housing rim
9 Holding groove section
10 Vehicle component
11 Structural component
12 Through-hole
13 Insertion direction
14 First side
15 Second side
16 Rim
17 Contact zone
18 Securing element
19 Materially-merged connection
20 Weld seam root
21 Holding groove
22 Joint
23 inner joint part
24 Bearing area
25 Joint stud
26 Bearing shell
27 Sealing bellows
28 Rim
29 Rim

The invention claimed is:

1. A method of producing a vehicle component comprising a structural component, having a through-hole, and a joint housing, having a housing opening, a closed housing bottom and a stop element located between the closed housing bottom and the housing opening, the method comprising:
   forming the closed bottom so as to be smaller in size than the through-hole to facilitate passing the closed bottom through the through-hole,
   inserting the joint housing into the through-hole of the structural component in a predetermined insertion direction, the through-hole defining a rim of the structural component that extends from a first side of the structural component to an opposite second side of the structural component, and, during insertion in the predetermined insertion direction, the closed bottom of the joint housing enters from the first side of side of the structural component, passes through the through-hole, and exits from the second side of the structural component,
   terminating insertion of the joint housing into the through-hole when the stop element of the joint housing contacts the first side of the structural component so that a securing element, which is formed integral with the joint housing, being located on the second side of the structural component opposite the stop element,
   connecting the joint housing to the rim of the structural component, in a materially-merged manner, after insertion of the joint housing,
   producing the materially-merged connection exclusively starting from the second side of the structural component toward the first side of the structural component in a direction away from the closed bottom and toward the stop element of the joint housing and opposite to the predetermined insertion direction, and
   following production of the materially-merged connection, the structural component being located between the stop element and the housing opening.

2. The method according to claim 1, further comprising the joint housing and the structural component are connected together in the material-merged manner such that the materially-merged connection extends completely from the second side to the first side of the structural component.

3. The method according to claim 1, further comprising completely joining a contact zone of the joint housing to the structural component in the materially-merged manner via welding such that all surfaces of the joint housing and the structural component in contact with each other are welded together.

4. The method according to claim 1, further comprising producing the materially-merged connection, between the joint housing and the structural component, by a beam-welding process.

5. The method according to claim 1, further comprising, before the joint housing is inserted, forming the stop element as a step projecting outward from an outside of the joint housing such that the stop element surrounds the joint housing radially relative to a central longitudinal axis.

6. The method according to claim 1, further comprising press-fitting the joint housing when the joint housing is inserted into the through-hole.

7. The method according to claim 1, further comprising forming a holding groove for fitting a rim of a sealing bellows between a housing rim of the joint housing and at least one of the stop element and a side of the structural component in contact with the stop element, and the housing rim projects radially, relative to a central longitudinal axis, and surrounds a housing opening of the joint housing.

8. The method according to claim 1, further comprising joining the joint housing and the structural component to one another by the materially-merged connection, the materially-merged connection being a weld seam that is formed starting from the second side of the structural component to the stop element, and the weld seam extending from a first formed end thereof at the second side to a root end thereof located at the stop element.

9. The method according to claim 8, further comprising, after at least one of insertion of the joint housing into the through-hole and forming the materially-merged connection of the joint housing to the structural component, using the securing element to additionally secure the joint housing onto the structural component.

10. The method according to claim 9, further comprising arranging the securing element in an area of the second side of the structural component such that the structural component is at least one of held and clamped between the stop element and the securing element.

11. The method according to claim 9, further comprising forming the securing element as a projection extending outward from the outside of the joint housing, such that the securing element extends all around the joint housing, and radially relative to a central longitudinal axis.

12. A vehicle component comprising a structural component, having a through-hole, and a joint housing, having a housing opening, a closed housing bottom and a stop element located between the closed housing bottom and the housing opening, the vehicle component being produced by a method including forming the closed bottom so as to be smaller in size than the through-hole to facilitate passing the closed bottom through the through-hole, inserting the joint housing into the through-hole of the structural component in a predetermined insertion direction from a first side of the structural component to an opposite second side of the structural component and, during insertion in the predetermined insertion direction, the closed bottom of the joint housing enters from the first side of side of the structural component, passes through the through-hole, and exits from the second side of the structural component; terminating insertion of the joint housing into the through-hole when the stop element of the joint housing contacts the first side of the structural component so that a securing element, which is formed integral with the joint housing, being located on the second side of the structural component opposite the stop element; following insertion of the joint housing, connecting the joint housing to the structural component in a materially-merged manner to form a materially-merged connection between the joint housing and the structural component; and materially-merged connection being a weld seam between the joint housing and the structural component, the weld seam being formed from the second side of the structural component toward the first side of the structural component in a direction away from the closed bottom and toward the stop element of the joint housing and opposite to the predetermined insertion direction such that the weld seam has an initially formed end located at the second side and a subsequently formed root end located at the stop element and the first side of the structural element, the weld seam extending over an entirety of a contact zone, between the joint housing and the structural component, as far as the stop element, and following production of the materially-merged connection, the structural component being located between the stop element and the housing opening.

13. A method of producing a vehicle component comprising a structural component, having a through-hole, and a joint housing, having an open end, a closed end and a stop element located between the closed end and the open end, the method comprising: producing the joint housing from sheet-metal by a deep-drawing process such that the joint housing having the closed end which is smaller in size than the through-hole to facilitate passage of the closed end through the through-hole while a section of the joint housing, adjacent the stop element is oversized; providing the structural component having the through-hole that extends completely through the structural component from a first side to an opposite second side of the structural component; inserting the joint housing into the through-hole of the structural component in an insertion direction such that the closed end of the joint housing enters the through-hole on the first side of the structural component first and then completely passes through the through-hole on the second side of structural component; terminating the insertion of the joint housing into the through-hole when the stop element of the joint housing contacts the first side of the structural component such that the oversized section of the joint housing, adjacent the stop element, is press-fitted into the through-hole of the structural component whereby the joint housing is held by friction force in the through-hole of the structural component while the closed end of the joint housing is located on the second side of the structural component and the open end of the joint housing is located on the first side of the structural component; forming a securing element, by a deformation during the press-fitting, which extends outward from an outer peripheral surface of the joint housing and co-operates with the second side of the structural component; materially merging the joint housing to the structural component from the second side of the structural component to form a materially merged connection between the joint housing and the structural component such that the materially merged connection has an initially formed weld seam end located at the second side of the structural component and a subsequently formed weld seam root end located at the stop element and the first side of the structural component such that the materially-merged connection exclusively starts from the second side of the structural component and extends toward the first side of the structural component in a direction away from the closed bottom and toward the stop element of the joint housing and opposite to the predetermined insertion direction and, following production of the materially-merged connection, the structural component being located between the stop element and the housing opening; and applying an electroplating coating to the vehicle component which covers at least one of the materially merged joint housing and the vehicle component.

14. The method according to claim 13, further comprising welding the joint housing to the structural component, from the second side of the structural component, such that the weld seam root end of the materially merged connection is located on the first side of the structural component.

* * * * *